(12) United States Patent
Nevejant et al.

(10) Patent No.: US 12,498,043 B1
(45) Date of Patent: Dec. 16, 2025

(54) SYSTEMS FOR A DAMPING SYSTEM

(71) Applicant: Dana Belgium N.V., Flanders (BE)

(72) Inventors: Hein Nevejant, Houthulst (BE);
Joachim Van Dingenen, Drongen (BE);
Victor Barrios Gonzalez, Ghent (BE)

(73) Assignee: DANA BELGIUM, Bruges (BE)

( * ) Notice: Subject to any disclaimer, the term of this patent is extended or adjusted under 35 U.S.C. 154(b) by 0 days.

(21) Appl. No.: 18/782,787

(22) Filed: Jul. 24, 2024

(51) Int. Cl.
*F16H 63/30* (2006.01)
*F16F 15/06* (2006.01)
*F16H 63/32* (2006.01)

(52) U.S. Cl.
CPC ............. *F16H 63/30* (2013.01); *F16F 15/06* (2013.01); *F16H 2063/3079* (2013.01); *F16H 2063/321* (2013.01)

(58) Field of Classification Search
CPC .. F16H 63/32; F16H 63/3023; F16H 57/0432; F16H 57/0468; F16H 63/30; F16H 2063/3079; F16H 2063/321; F16F 15/06
See application file for complete search history.

(56) References Cited

U.S. PATENT DOCUMENTS

| | | | |
|---|---|---|---|
| 8,037,780 B2 | 10/2011 | Caenazzo et al. | |
| 9,279,494 B2 * | 3/2016 | Wascheul | F16H 63/3023 |

FOREIGN PATENT DOCUMENTS

| | | | | |
|---|---|---|---|---|
| CN | 113389897 A | | 9/2021 | |
| DE | 102007035291 A1 * | | 1/2009 | ......... F16H 63/3023 |
| DE | 102011110611 A1 | | 2/2013 | |
| JP | 3481224 B2 * | | 12/2003 | |
| KR | 19980055192 U | | 10/1998 | |
| WO | WO-2007020433 A1 * | | 2/2007 | ........... F16H 7/0456 |

* cited by examiner

*Primary Examiner* — Victor L MacArthur
(74) *Attorney, Agent, or Firm* — McCoy Russell LLP

(57) ABSTRACT

Systems are provided for a clutch system. In one example, a system includes a shift rod comprising an axial channel, a shift fork, a first spring system arranged on a first side of the shift fork, and a second spring system arranged on a second side of the shift fork, the second side opposite the first side, wherein the axial channel is fluidly coupled to a cavity of the first spring system or the second spring system during an actuation of the shift rod and the shift fork.

20 Claims, 5 Drawing Sheets

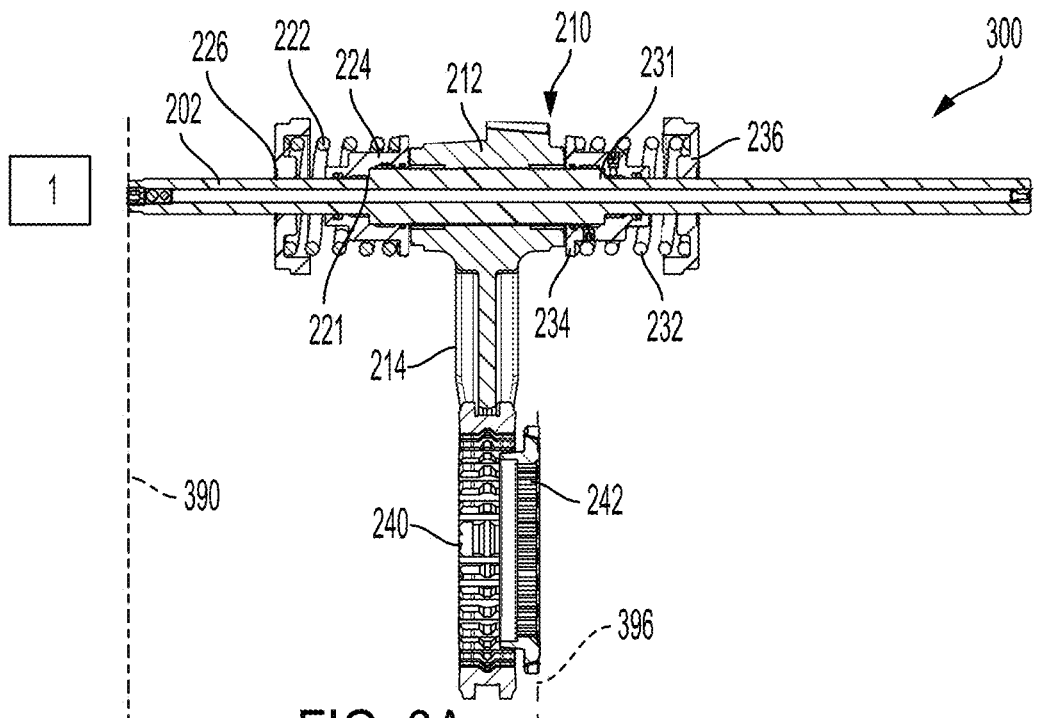
FIG. 3A
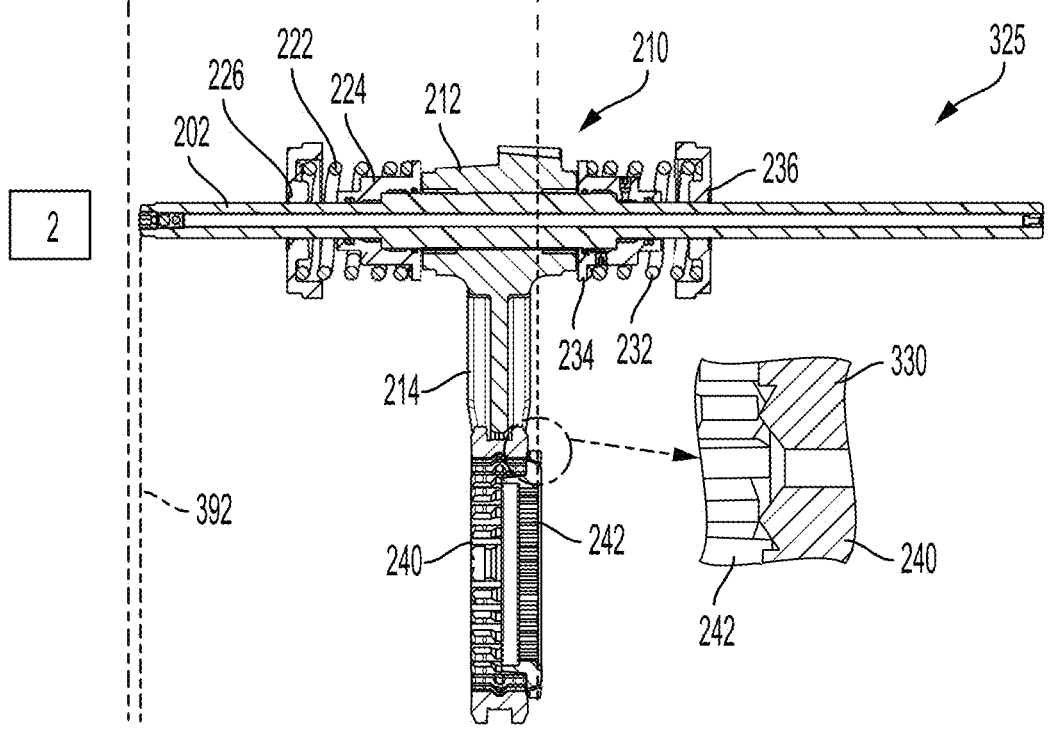
FIG. 3B
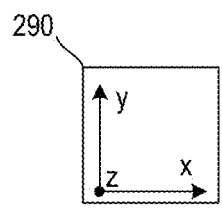

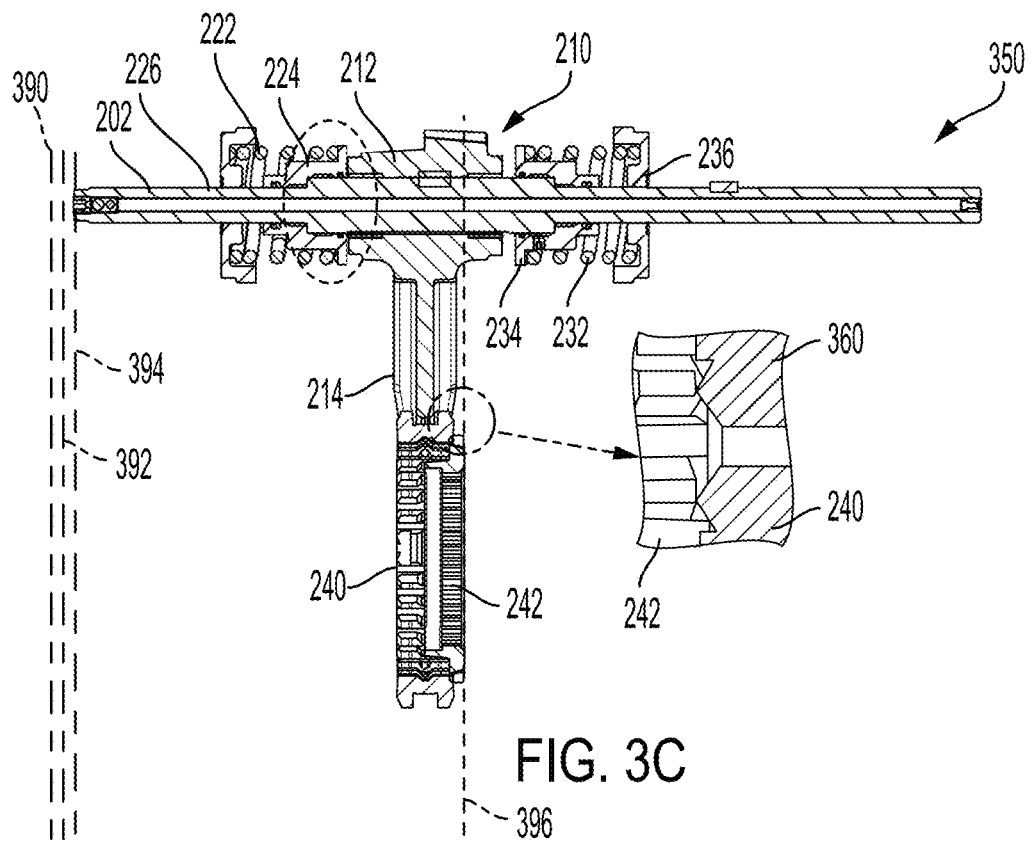
FIG. 3C
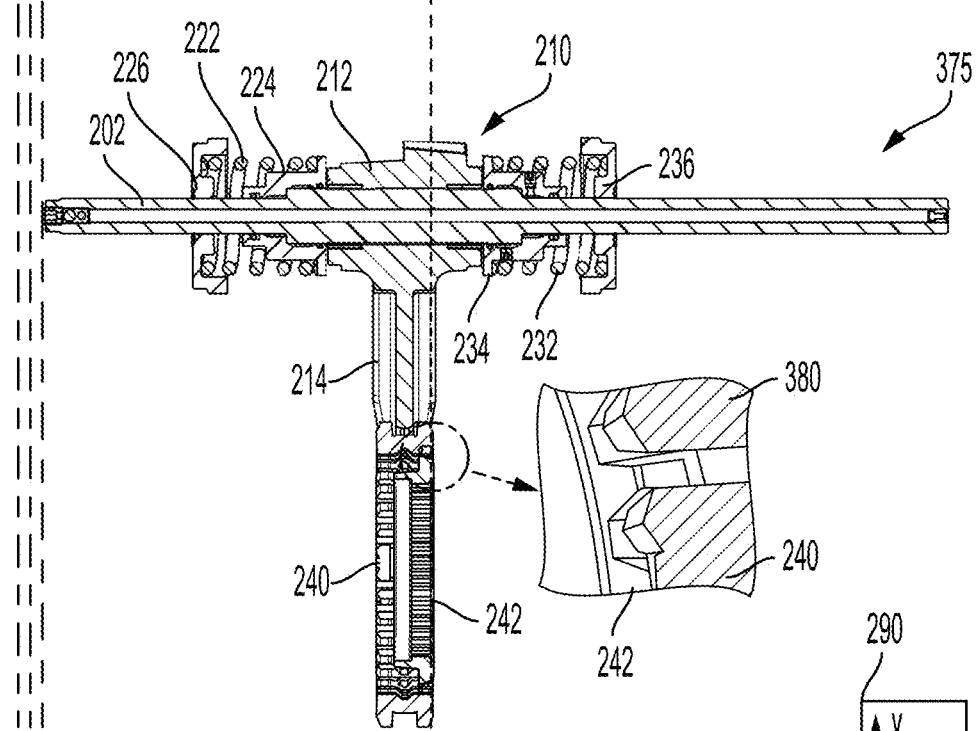
FIG. 3D
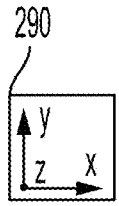

SYSTEMS FOR A DAMPING SYSTEM

TECHNICAL FIELD

The present description relates generally to a damping system for a dog clutch.

BACKGROUND AND SUMMARY

Vehicle systems may include a plurality of rotating components. Various combinations of the rotating components may be realized to achieve different gear ratios, operation of different components, and different power transfer pathways. To achieve different connections between rotating components, the vehicle system may include clutches and actuation mechanisms configured to couple and decouple the rotating components.

One type of clutch used to connect rotating shafts includes a dog clutch. A dog clutch may include a plurality of teeth that interlock with one another. During some engagements, the teeth may not interlock correctly, resulting in a stall torque that may reduce a longevity of the actuation mechanisms and shifting components. Incorrect tooth interlocking may include tooth tips contacting one another. The teeth may then shift into a respective gap with a higher force, which may generate a noise and degrade surrounding components. Systems alternative to those already present may be desired.

The issues described above may be addressed by a system including a shift rod comprising an axial channel, a shift fork, a first spring system arranged on a first side of the shift fork, and a second spring system arranged on a second side of the shift fork, the second side opposite the first side, wherein the axial channel is fluidly coupled to a cavity of the first spring system and the second spring system. In this way, a clutch may include a combination of a spring and dampening system configured to enhance clutch operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 3A, 3B, 3C, and 3D show separate steps of the dog clutch and the actuation mechanism engaging two separate shafts.

DETAILED DESCRIPTION

Figure 1:
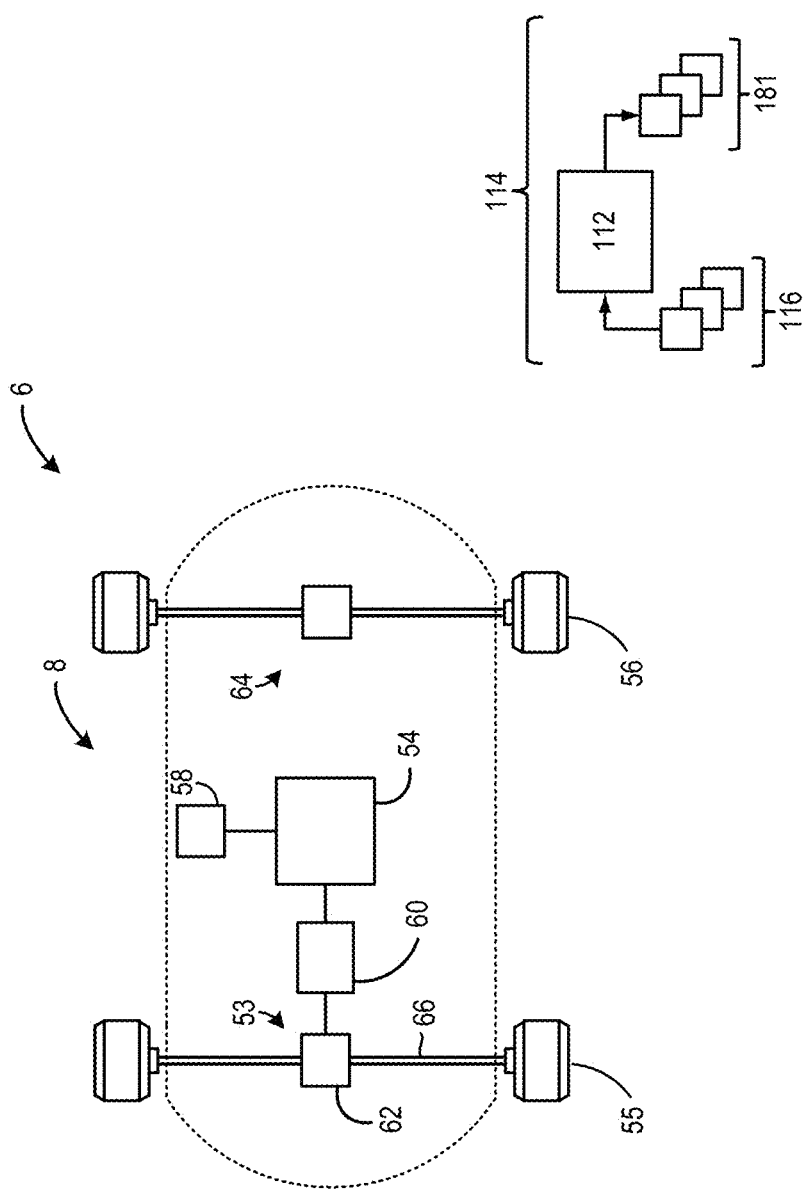
FIG. 1 shows an example of a vehicle system.
Figure 2:
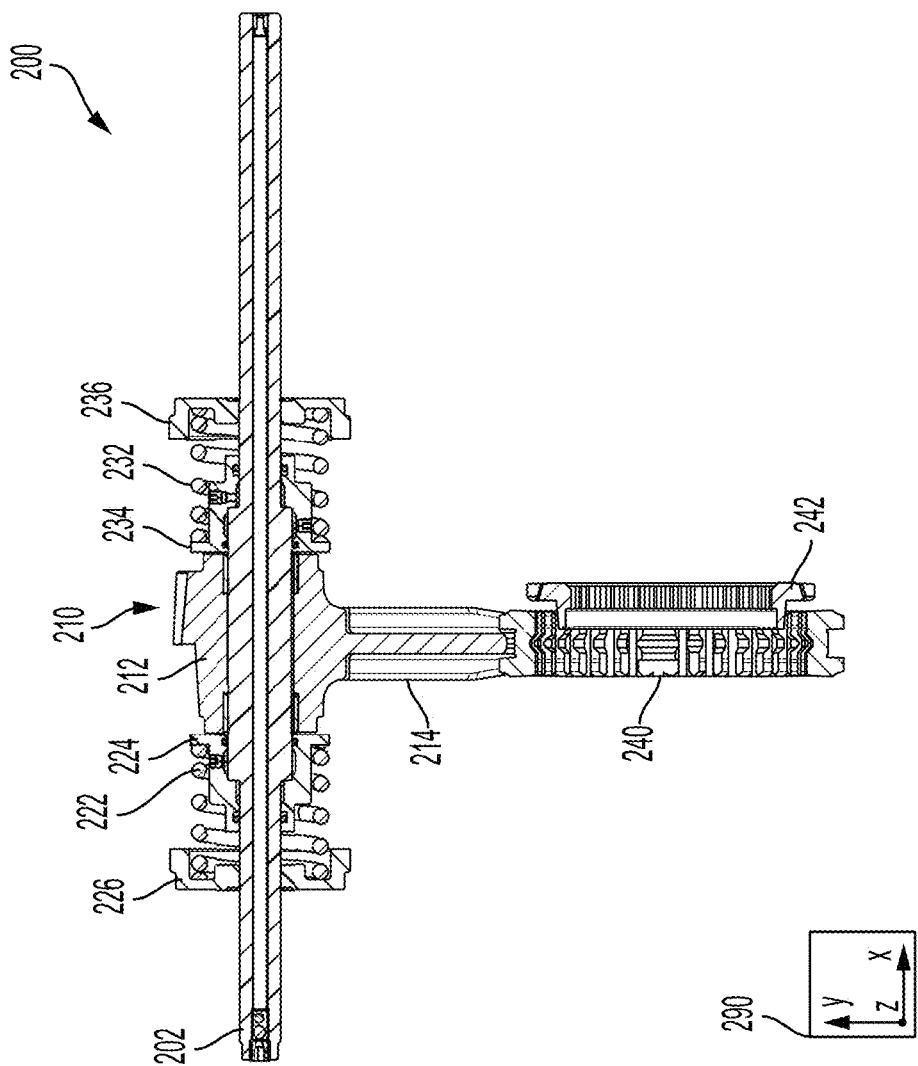
FIG. 2 shows an example of a dog clutch and actuation mechanism of the vehicle.
Figure 4A:
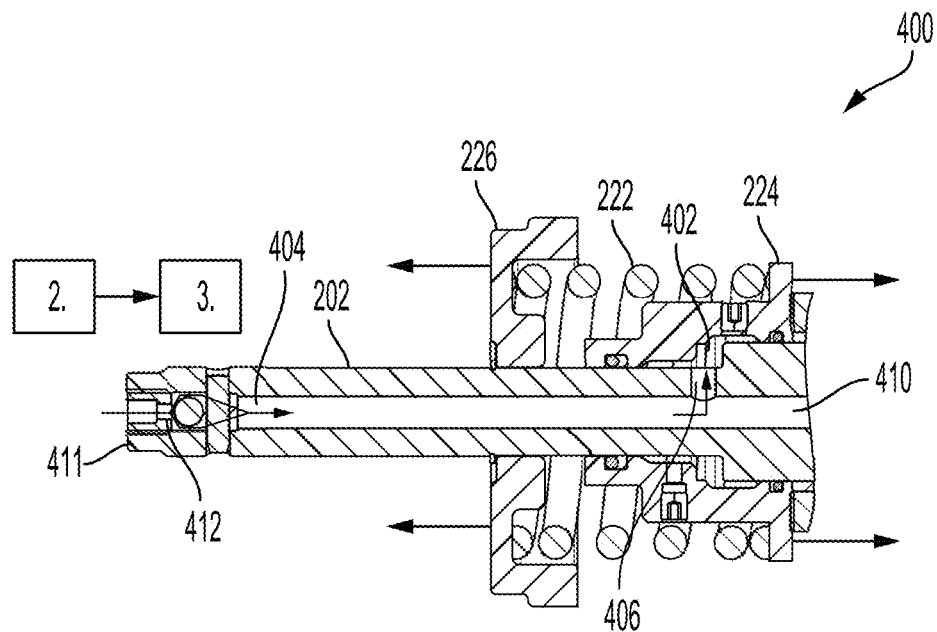
FIG. 4A shows a detailed view of a third stage of the dog clutch and the actuation mechanism engaging two separate shafts.
Figure 4B:
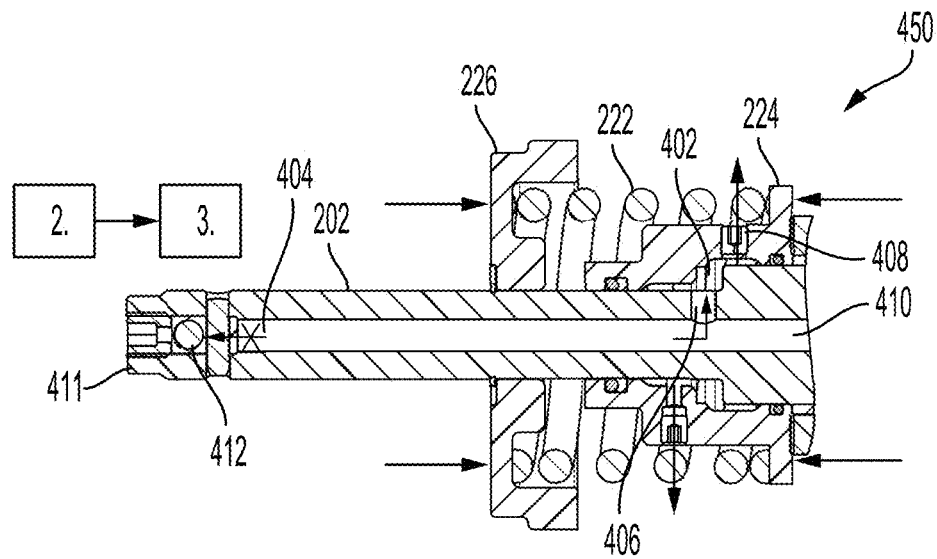
FIG. 4B shows a detailed view of a fourth stage of the dog clutch and the actuation mechanism engaging two separate shafts.

The following description relates to systems for a lubrication system. The lubrication system may be included in an axle of a vehicle. FIG. 1 shows an example of a vehicle comprising the lubrication system. FIG. 2 shows an example of a dog clutch and actuation mechanism of the vehicle. FIGS. 3A, 3B, 3C, and 3D show separate steps of the dog clutch and the actuation mechanism engaging two separate shafts. FIG. 4A shows a detailed view of a third step of the dog clutch and the actuation mechanism engaging two separate shafts. FIG. 4B shows a detailed view of a fourth step of the dog clutch and the actuation mechanism engaging two separate shafts.

FIG. 1 shows a schematic depiction of a vehicle 6 with a powertrain 8 that may include a prime mover 54 and a transmission 60. The vehicle 6 may be a passenger vehicle, a commercial vehicle, a heavy-duty vehicle, an off-highway vehicle, an agricultural vehicle, a boat, or other vehicle system that utilizes lubricant.

The prime mover 54 may be electrically connected to an energy storage device 58 (e.g., one or more traction batteries, capacitors, fuel cells, combinations thereof, and the like). Further, the prime mover 54 may be configured to operate as a generator, during selected conditions, to provide electrical power to charge the energy storage device 58, for example.

In some examples, the vehicle 6 may include an internal combustion engine (ICE) configured to operate in combination with or independently of the prime mover 54. In this way, the vehicle 6 may be configured as a hybrid vehicle in some examples.

In the illustrated example, the transmission 60 delivers mechanical power to a differential 62 of an axle assembly 53. However, it will be appreciated that the transmission 60 may additionally or alternatively deliver mechanical power to the other axle 64 in the vehicle 6. Still further, in other examples, the transmission may be incorporated into one of the axles to form an electric axle assembly. In the electric axle example, an internal combustion engine may provide mechanical power to the other axle, in some cases. The axle assembly 53 may include a lubrication system, as will be described in greater detail below.

The transmission 60 (e.g., a gearbox) may be configured to receive torque from the prime mover 54 via a shaft (e.g., a drive shaft) and/or other suitable mechanical components. The transmission 60 may output torque to the differential 62. The output torque may be moderated based on selective adjustments to gear engagement at the transmission 60 to accommodate desired vehicle operation. Torque from the transmission 60 may drive rotation of the differential 62, which may in turn drive rotation of axle shafts 66 which are rotationally coupled to vehicle wheels 55. Vehicle wheels 56 may rotate when vehicle wheels 55 are rotating against a surface.

A controller 112 may form a portion of a control system 114. The control system 114 is shown receiving information from sensors 116 and sending control signals to actuators 181. As one example, the sensors 116 may include sensors such as a battery state of charge sensor, a clutch linear position sensor, one or more angular position sensors of the electric motor, etc. The controller 112 may receive input data from the sensors, process the input data via a processor, and trigger the actuators in response to the processed input data based on instruction or code programmed therein corresponding to one or more routines.

Turning now to FIG. 2, it shows a system 200 including a clutch and an actuation mechanism. The system 200 may include a shift rod 202. The shift rod 202 may extend through a shift fork 210. The shift fork 210 may include a first body 212 and a second body 214. The first body 212 may extend in a direction parallel to the shift rod 202. The second body 214 may extend in a direction normal to the shift rod 202.

An axis system 290 is shown including three axes, including an x-axis parallel to an axial direction, a y-axis parallel to a vertical direction, and a z-axis parallel to a transverse direction. The shift rod 202 may extend in a direction parallel to the x-axis.

The system 200 may include a first spring 222 arranged between a first spring retainer 224 and a first end cap 226. The first spring 222 may be configured to compress and expand between the first spring retainer 224 and the first end cap 226. The first spring retainer 224 may be in face-sharing contact with and pressed against a first collar 221 of the shift rod 202.

The system 200 may further include a second spring 232 arranged between a second spring retainer 234 and a second end cap 236. The second spring 232 may be configured to compress and expand between the second spring retainer 234 and the second end cap 236. The second spring retainer 234 may be in face-sharing contact with and pressed a second collar 231 of the shift rod. The second spring 232, the second spring retainer 234, and the second end cap 236 may be identical to the first spring 222, the first spring retainer 224, and the first end cap 226, respectively. The shift fork 210, the shift rod 202, the springs, and the corresponding surfaces associated with the springs may be included in the actuation mechanism of the system 200. The first collar 221 and the second collar 231 may be configured to stop axial movement of the shift fork 210. For example, the first collar 221 may stop axial movement in a first direction and the second collar 231 may stop movement in a second direction opposite the first direction.

A clutch sleeve 240 may be coupled to the second body 214 of the shift fork 210. The clutch sleeve 240 may include a splined inner circumference that engages with a clutch body ring 242. The clutch body ring and the clutch sleeve 240 may be included in the clutch of the system 200. The clutch sleeve 240 may rotate with respect to the shift fork 210. The shift fork 210 may not rotate and may only move axially via the action of the rod 202. As such, the shift fork 210 may slide in the clutch sleeve 240. Operation of the clutch and the actuation mechanism are described in greater detail below.

Turning now to FIGS. 3A-3D, they show different stages of an engagement operation of the system 200. As such, components previously introduced may be similarly numbered in this and subsequent figures. FIGS. 4A and 4B show detailed views of some of the different stages and are described in tandem with FIGS. 3A-3D. During the stages of FIGS. 3A-3D, the shift rod 202 may move further in a direction parallel to the x-axis while the clutch ring 242 may remain at a fixed axial position. In one example, the clutch ring 242 is stationary. Dashed lines 390, 392, and 394 are used to indicate an axial displacement of the shift rod 202 during the engagement operation. Dashed line 396 is used to indicate a fixed position of the clutch ring 242 during the engagement operation shown in FIGS. 3A-3D.

Stage 300 of FIG. 3A illustrates a neutral and/or a starting position of the shift rod 202. As illustrated, a first extreme end of the shift rod 202 is aligned with a first dashed line 390 at a first axial position. An outside of the clutch ring 242 is aligned with a dashed line 396 along its outer face opposite the clutch sleeve 240.

Stage 325 of FIG. 3B illustrates movement of the shift rod 202 in the axial direction. The shift rod 202 moves such that the first extreme end is aligned with a second dashed line 392 and axially displaced from the first dashed line 390. The clutch sleeve 240 moves axially with the shift rod 202. The clutch ring 242 remains stationary and its outer face stays aligned with the dashed line 396. As such, the clutch sleeve 240 makes contact with teeth of the clutch ring 242, as shown in detailed view 330.

Stage 350 of FIG. 3C illustrates the shift rod 202 moving axially following engagement of the clutch sleeve 240 with teeth of the clutch ring 242. In one example, the second spring 232 is compressed, thereby allowing the shift fork 210 and the shift rod 202 to move further in the axial direction. In one example, the first extreme end of the shift rod 202 is aligned with a third dashed line 394 and axially displaced from the second dashed line 392. Engagement between the clutch ring 242 and the clutch sleeve 240 may remain unchanged from stage 325 to stage 350, as shown in detailed view 360.

The first spring 222 and the second spring 232 may provide the benefit of the realization of stage 350, which may not be achieved in previous shifting systems that do not include the springs. Previous examples of systems may be stuck or move slowly following the second stage 325 and experience the issues with shifting systems described above. The first spring 222 and the second spring 232 may allow the shift fork 210 to slide along the shift rod 202. An actuation motor may continue to rotate to a desired position independent of an engagement of the teeth of the clutch sleeve 240 and the clutch ring 242. In this way, the shift fork 210 may move axially prior to interlocking the teeth between the clutch ring 242 and the clutch sleeve 240.

While one of the first spring 222 or the second spring 232 is compressed, a cavity expands between the shift rod 202 and the spring retainer of the spring being compressed. For example, if the second spring 232 is being compressed, the first spring 222 is stationary, thereby forming a cavity 402 between the first spring retainer 224 and the shift rod 202, as shown in example 400 of FIG. 4A. The first spring 222 may remain stationary via a collar coupled to the first spring retainer 224. When the first spring 222 compresses, the second spring 232 may remain stationary via a collar coupled to the second spring retainer 234. The cavity 402 is filled with lubricant 404 by a vacuum generated during the formation of the cavity 402. The lubricant may flow through a hole 406 of the shift rod 202, wherein the hole is sized to allow lubricant flow without presenting resistance to compression of the spring. The hole 406 is fluidly coupled to a central channel 410 of the shift rod 202. The cavity 402 may extend around a circumference of the shift rod 202.

Stage 375 of FIG. 3D illustrates the first extreme end of the shift rod 202 aligned with the third dashed line 394. As such, the shift rod 202 does not move axially from the third stage 350 to the fourth stage 375, but the shift fork 210 is moving to the right by the force of spring 222. This occurs when the teeth of the clutch (e.g., the clutch ring 242 and the clutch sleeve 240) are aligned. The teeth of the clutch ring 242 mesh with the clutch sleeve 240, as shown in detailed view 380. In one example, the teeth of the clutch ring 242 are fully meshed with teeth of the clutch sleeve 240, wherein fully meshed is defined as a tooth of the clutch ring 242 between neighboring teeth of the clutch sleeve 240. The first spring 222 is decompressing (e.g., expanding) while the teeth are meshing. As such, oil in the cavity 402 may be expelled through a plurality of orifices 408 of the cavity 402, as shown in example 450 of FIG. 4B. The shift rod 202 may include a valve 412 that blocks lubricant from exiting the cavity 402 via the hole 406, and force the oil to exit via the small orifices causing a damping of the spring force. The channel 410 is an axial channel, wherein a radial passage extends from the channel 410 to the cavity 402.

In one example, when the cavity is expanding oil is taken without restriction from the inlet. But when the spring in expanding again and forcing the oil out, the inlet is sealed via the valve 412 to force the oil to exit via the orifices 408 to provide flow restriction. This is to damp the spring release, resulting in a slower speed of the retainer, preventing impact and noise, which may increase customer satisfaction and performance.

The orifices 408 may be arranged at different locations of the cavity 402 such that a distance between a first orifice and the first spring retainer 224 is different than a distance between a second orifice and the first spring retainer 224. In one example, the orifices 408 are axially misaligned. The staggered arrangements of the orifices 408, along with a size of the orifices 408, may restrict (e.g., meter) lubricant outflow gradually. At the start of the expanding, all orifices 408 may be connected to cavity 402, but at the end of the expansion only the orifices closer to the inlet are fully (without restriction) connected to cavity 402. Thereby generating a damping effect and slowing down a speed of the shift fork 210 and the clutch sleeve 240. Due to the arrangement of the orifices the speed of the spring retainer 224 and thus, the fork 210 decreases stepwise in speed before contacting the collar of rod 202, decreasing the speed of impact before the impact while keeping the speed sufficiently high when the impact is further away to allow a fast meshing when the teeth get aligned. The fast meshing includes where the meshing is not perceived by a vehicle operator via characteristics of noise, vibration, and harshness (NVH). Fast meshing is needed to mesh the spline teeth fully before torque is transferred on the spline. Otherwise the torque may be transferred when the spline is not fully meshed yet, which could result in spline degradation. In this way, the clutch sleeve 240 may not contact another component above a threshold speed, thereby mitigating degradation.

When disengaging, the teeth of the clutch sleeve 240 disengage with teeth of the clutch body ring 242 and the shift rod 202 and the shift fork 210 may move from the third dashed line 394 to the first dashed line 390. But during the disengaging operation, it is possible that the dog clutch is still torqued preventing the opening of the mesh. In this case, the cavity of the second spring retainer 234 may receive lubricant, while the second spring 232 is compressing. Herein, the cavity 402 of the first spring is referred to as a first cavity and the cavity of the second spring is referred to as a second cavity. That is to say, the first spring 222 may stay at its original length and the second spring 232 may compress, thereby generating a vacuum in the second cavity that promotes lubricant flow from the channel 410 to the second cavity. The second spring 232 may expand once the torque on the dog clutch is removed, which may decrease a volume of the second cavity and force lubricant through a plurality of orifices of the second cavity. The plurality of orifices of the second cavity may be axially misaligned similar to the plurality of orifices 408 of the first cavity 402, as the same valve 412 is preventing the oil to exit via the inlet again. As illustrated, the second cavity is not fluidly sealed from the first cavity 402, they are fluidly connected via the channel 410. As such, some oil from the second cavity can also escape through the orifices of the cavity (and opposite), but as long as the flow is exiting via smaller orifices, the flow is restricted and the spring release is damped. Both cavities are fluidly coupled during all operations of the clutch, but the inlet is blocked when one of the cavities is shrinking, occurring when the corresponding spring is expanding. An example of the second cavity and the plurality of orifices thereof is shown in FIG. 2.

The disclosure also provides support for a system, comprising: a shift rod comprising an axial channel, a shift fork, a first spring system arranged on a first side of the shift fork, and a second spring system arranged on a second side of the shift fork, the second side opposite the first side, wherein the axial channel is fluidly coupled to a cavity of the first spring system and the second spring system. In a first example of the system, the first spring system comprises a first spring, a first spring retainer, and a first end cap, wherein the cavity of the first spring system is arranged between the first spring retainer and the shift rod. In a second example of the system, optionally including the first example, the second spring system comprises a second spring, a second spring retainer, and a second end cap, wherein the cavity of the second spring system is arranged between the second spring retainer and the shift rod. In a third example of the system, optionally including one or both of the first and second examples, the cavity includes a plurality of orifices configured to expel lubricant. In a fourth example of the system, optionally including one or more or each of the first through third examples, orifices of the plurality of orifices are arranged at different axial positions. In a fifth example of the system, optionally including one or more or each of the first through fourth examples, the shift fork is coupled to a clutch sleeve, the clutch sleeve can be engaged to or disengaged from a clutch body ring. In a sixth example of the system, optionally including one or more or each of the first through fifth examples, the clutch body ring is at a fixed axial position on the rotating part to be clutched as the shift rod and the shift fork are axially actuated.

The disclosure also provides support for a system for a clutch, comprising: a shift rod extending through a shift fork, a first spring arranged between a first spring retainer and a first end cap, the first spring retainer in contact with a first collar on the rod configured to stop fork axial movement in a first direction, a second spring arranged between a second spring retainer and a second end cap, the second spring retainer in contact with a collar on the rod configured to stop fork axial movement in a second direction opposite the first, and a channel of the shift rod fluidly coupled to a cavity arranged between the first spring retainer and the shift rod In a first example of the system, the shift rod comprises a valve arranged at an inlet of the channel. In a second example of the system, optionally including the first example, the channel is fluidly coupled to a second cavity arranged between the second spring retainer and the shift rod. In a third example of the system, optionally including one or both of the first and second examples, the cavity comprises a plurality of orifices configured to expel lubricant from the cavity. In a fourth example of the system, optionally including one or more or each of the first through third examples, each of the plurality of orifices is arranged at different axial locations of the cavity. In a fifth example of the system, optionally including one or more or each of the first through fourth examples, the channel is an axial channel, further comprising a radial channel extending toward the cavity. In a sixth example of the system, optionally including one or more or each of the first through fifth examples, the system further comprises: a clutch sleeve coupled to the shift fork, wherein the clutch sleeve is coupled to a clutch body ring. In a seventh example of the system, optionally including one or more or each of the first through sixth examples, the clutch is a dog clutch.

The disclosure also provides support for a system, comprising: a shift rod extending through a shift fork, a first spring arranged on a first side of the shift fork, and a second spring arranged on a second side of the shift fork, the first spring, wherein a first cavity is arranged between a first spring retainer and the shift rod and a second cavity is arranged between a second spring retainer and the shift rod, each of the first cavity and the second cavity is fluidly coupled to a channel of the shift rod. In a first example of the system, the system further comprises: a clutch sleeve coupled to the shift fork, wherein the clutch sleeve is configured to mesh or disengage with a clutch body ring based on an axial displacement of the shift rod and the shift fork. In a second example of the system, optionally including the first example, the first spring retainer is pressed against a first collar of the shift rod configured to limit movement of the shift fork in a first axial direction and the second spring retainer is pressed against a second collar of the shift rod, the second collar configured to limit movement of the shift fork in a second axial direction opposite the first axial direction. In a third example of the system, optionally including one or both of the first and second examples, the first cavity and the second cavity are configured to only receive lubricant from the channel. In a fourth example of the system, optionally including one or more or each of the first through third examples, the channel comprises a valve arranged at an inlet of the channel, and wherein the first cavity and the second cavity comprise a plurality of orifices configured to expel lubricant.

FIGS. 2-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 2-4B are shown approximately to scale.

The following claims particularly point out certain combinations and sub-combinations regarded as novel and nonobvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a shift rod comprising an axial channel;
   a shift fork;
   a first spring system arranged on a first side of the shift fork; and
   a second spring system arranged on a second side of the shift fork, the second side opposite the first side, wherein the axial channel is fluidly coupled to a cavity of the first spring system and a cavity of the second spring system, and wherein the axial channel is the only axial channel of the shift rod.

2. The system of claim 1, wherein the first spring system comprises a first spring, a first spring retainer, and a first end cap, wherein the cavity of the first spring system is arranged between the first spring retainer and the shift rod.

3. The system of claim 1, wherein the second spring system comprises a second spring, a second spring retainer, and a second end cap, wherein the cavity of the second spring system is arranged between the second spring retainer and the shift rod.

4. The system of claim 1, wherein the cavity of the first spring system and the cavity of the second spring system include a plurality of orifices configured to expel lubricant.

5. The system of claim 4, wherein orifices of the plurality of orifices are arranged at different axial positions.

6. The system of claim 1, wherein the shift fork is coupled to a clutch sleeve, the clutch sleeve can be engaged to or disengaged from a clutch body ring.

7. The system of claim 6, wherein the clutch body ring is at a fixed axial position on a rotating part to be clutched as the shift rod and the shift fork are axially actuated.

8. A system for a clutch, comprising:
   a shift rod extending through a shift fork;
   a first spring arranged between a first spring retainer and a first end cap, the first spring retainer in contact with a collar on the shift rod configured to stop fork axial movement in a first direction;
   a second spring arranged between a second spring retainer and a second end cap, the second spring retainer in contact with the collar on the shift rod configured to stop fork axial movement in a second direction opposite the first; and
   an axial channel of the shift rod fluidly coupled to a cavity arranged between the first spring retainer and the shift rod, wherein the axial channel is the only axial channel of the shift rod.

9. The system of claim 8, wherein the shift rod comprises a valve arranged at an inlet of the axial channel.

10. The system of claim 8, wherein the axial channel is fluidly coupled to a second cavity arranged between the second spring retainer and the shift rod.

11. The system of claim 8, wherein the cavity comprises a plurality of orifices configured to expel lubricant from the cavity.

12. The system of claim 11, wherein each of the plurality of orifices is arranged at different axial locations of the cavity.

13. The system of claim 8, further comprising a radial channel extending toward the cavity.

14. The system of claim 8, further comprising a clutch sleeve coupled to the shift fork, wherein the clutch sleeve is coupled to a clutch body ring.

15. The system of claim 8, wherein the clutch is a dog clutch.

16. A system, comprising:
a shift rod extending through a shift fork, a first spring arranged on a first side of the shift fork, and a second spring arranged on a second side of the shift fork, wherein a first cavity is arranged between a first spring retainer and the shift rod and a second cavity is arranged between a second spring retainer and the shift rod, each of the first cavity and the second cavity is fluidly coupled to an axial channel of the shift rod, and wherein the axial channel is the only axial channel of the shift rod.

17. The system of claim 16, further comprising a clutch sleeve coupled to the shift fork, wherein the clutch sleeve is configured to mesh or disengage with a clutch body ring based on an axial displacement of the shift rod and the shift fork.

18. The system of claim 16, wherein the first spring retainer is pressed against a first collar of the shift rod configured to limit movement of the shift fork in a first axial direction and the second spring retainer is pressed against a second collar of the shift rod, the second collar configured to limit movement of the shift fork in a second axial direction opposite the first axial direction.

19. The system of claim 16, wherein the first cavity and the second cavity are configured to only receive lubricant from the channel, and wherein the first cavity comprises a plurality of orifices that are misaligned with a plurality of orifices of the first cavity.

20. The system of claim 16, wherein the channel comprises a valve arranged at an inlet of the channel, and wherein the first cavity and the second cavity comprise a plurality of orifices configured to expel lubricant.

\* \* \* \* \*